(12) United States Patent
Côté

(10) Patent No.: US 8,794,184 B2
(45) Date of Patent: Aug. 5, 2014

(54) SUET FEEDER

(76) Inventor: Paul Côté, Lac Brome (CA)

( * ) Notice: Subject to any disclaimer, the term of this patent is extended or adjusted under 35 U.S.C. 154(b) by 266 days.

(21) Appl. No.: 12/924,338

(22) Filed: Sep. 23, 2010

(65) Prior Publication Data

US 2012/0073505 A1 Mar. 29, 2012

(51) Int. Cl.
*A01K 39/00* (2006.01)
*A01K 39/01* (2006.01)

(52) U.S. Cl.
CPC ......... *A01K 39/0113* (2013.01); *A01K 39/0106* (2013.01)
USPC ........................................ 119/52.3; 119/57.9

(58) Field of Classification Search
USPC ........ 119/51.01, 51.03, 52.2, 52.3, 57.8, 57.9
See application file for complete search history.

(56) References Cited

U.S. PATENT DOCUMENTS

| | | | | |
|---|---|---|---|---|
| 5,937,787 A * | 8/1999 | Kopis | ........................... | 119/57.8 |
| 6,253,707 B1 * | 7/2001 | Cote | ........................... | 119/57.9 |
| 7,219,621 B2 * | 5/2007 | Coroneos | ...................... | 119/57.1 |
| 2003/0127056 A1 * | 7/2003 | Chrisco et al. | ................ | 119/52.2 |
| 2003/0226514 A1 * | 12/2003 | Cote | ........................... | 119/57.9 |
| 2007/0084412 A1 * | 4/2007 | Eager | .......................... | 119/51.03 |
| 2008/0210172 A1 * | 9/2008 | Waikas | ......................... | 119/52.3 |
| 2008/0295777 A1 * | 12/2008 | Cote | ............................ | 119/52.3 |

* cited by examiner

*Primary Examiner* — David Parsley
*Assistant Examiner* — Thien Thanh Pham
(74) *Attorney, Agent, or Firm* — Eric Fincham

(57) ABSTRACT

A suet feeder which comprises a housing having a spring and a suet holder connected to the housing, the suet holder being sized to retain a prepackaged package of suet, a shroud extending about the suet holder and at least a portion of the housing, a spring biasing the shroud upwardly with respect to the housing and suet holder, the shroud having at least one suet access opening to permit access to the suet holder with the shroud being moveable between an open position permitting access to the suet holder and a closed position wherein access to the suet holder is denied, and a cover secured to the shroud. The suet feeder is designed to deter access to the suet by marauders such as squirrels.

18 Claims, 16 Drawing Sheets

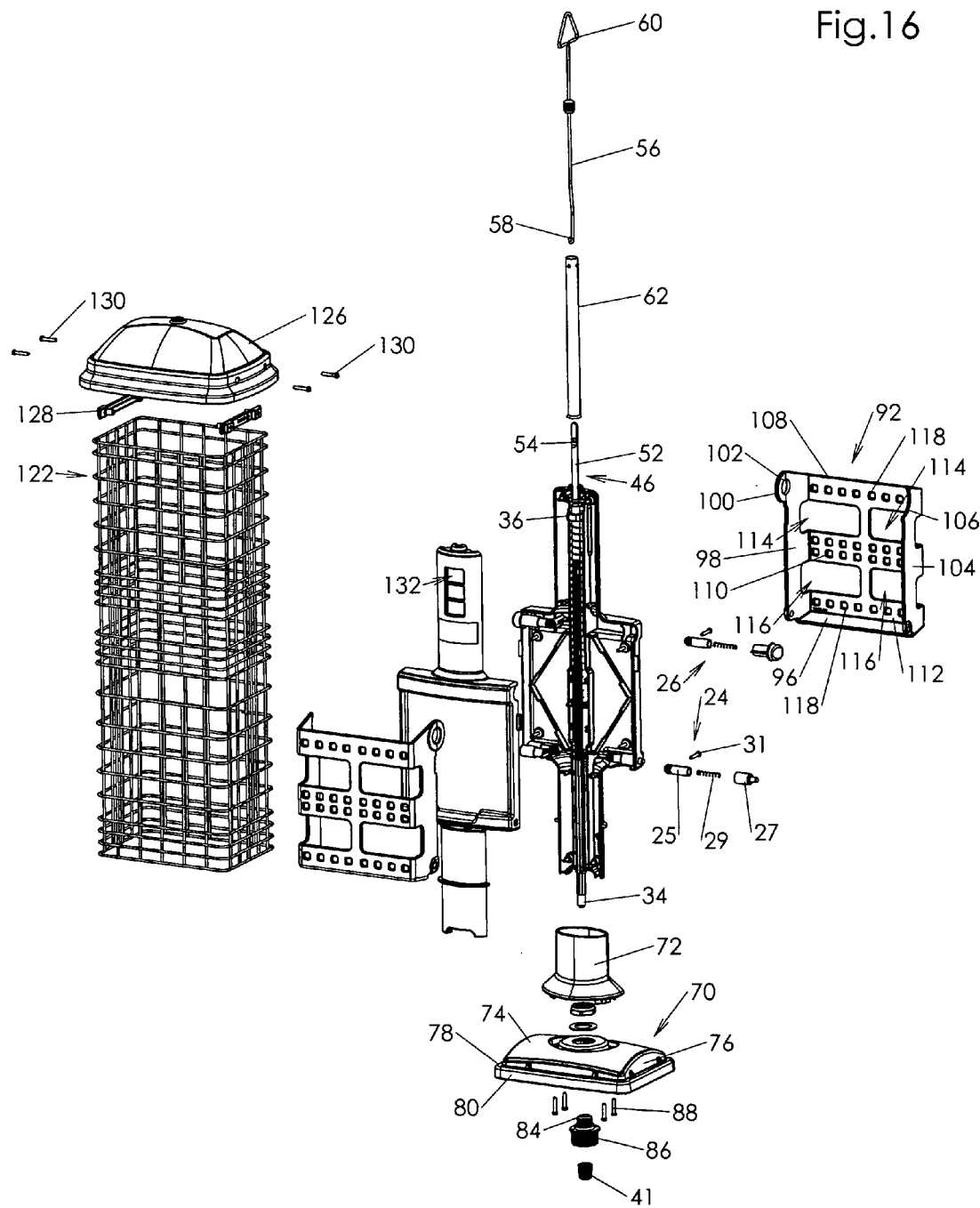

SUET FEEDER

FIELD OF THE INVENTION

The present application relates to a suet feeder and more particularly, relates to a squirrel resistant suet feeder.

BACKGROUND OF THE INVENTION

Suet feeders for feeding birds are widely used. Although some people will make their own suet and hang it out by a piece of string or in a different fashion, most people cannot be bothered to make their own suet. Accordingly, there is a substantial market for prepackaged suet which traditionally comes in a plastic container with a layer of material sealed thereto. Typically, this layer of material is a flexible plastic material.

In order to accommodate this prepackaged suet, various simple feeders have been utilized. One popular arrangement is the use of a metal cage to which a hanger is attached. Thus, one merely removes the suet from the package and inserts it into the container, closes the container and the container being hung from a suitable hook or the like.

While the above feeders are inexpensive, they suffer from a couple of disadvantages. One of these is the mess which typically occurs when one grips the opened package by hand since the warmth of the hand will tend to melt the fat component of the suet. Also, the suet is susceptible to being eaten by undesired marauders such as squirrels. One or two of the squirrels can easily eat the contents of one of the suet packages.

SUMMARY OF THE INVENTION

It is an object of the present invention to provide a squirrel resistant suet feeder.

According to one aspect of the present invention, there is provided a suet feeder comprising a housing having a spring mounted therein, a suet holder connected to the central housing, the suet holder being sized to retain a prepackaged package of suet, a shroud extending about the suet holder and at least a portion of the central housing, the spring biasing the shroud upwardly with respect to the central housing and suet holder, the shroud having at least one suet access opening therein to permit access to the suet holder, the shroud being moveable between an open position permitting access to the suet holder and a closed position wherein access to the suet holder is denied, and a cover secured to the shroud.

It is a further object of the present invention to provide a suet feeder and a prepackaged package of suet comprising a housing having a spring mounted therein, a suet holder connected to the housing, the prepackaged package of suet being mounted in the suet holder, a shroud extending about the suet holder and at least a portion of the housing, the spring biasing the shroud upwardly with respect to the housing and suet holder, the shroud having at least one suet access opening to permit access to the suet holder, the shroud being moveable between an open position permitting access to the suet holder and a closed position where access to the suet holder is denied, and a cover secured to the shroud.

The suet feeder of the present invention is designed to be compatible with commercially available prepackaged packages of suet. These packages are generally very similar and usually comprise a plastic tray in which the suet with seed is placed. The tray is then conventionally wrapped with a plastic wrap to seal the same. Typically, the suet tray is approximately 5" by 5" with a depth of one inch. Naturally, the invention of the present invention can be manufactured to accommodate any other size of prepackaged suet if so desired. The preparation of the prepackaged suet can also be done by the user.

The suet feeder preferably is arranged such that a housing mounts the operative components inside. In turn, one or more suet holders are placed on the exterior of the housing. The suet feeders are designed to accept the prepackaged packages of suet after removal of the plastic wrap. In a preferred embodiment, there are provided a pair of suet holders, each of the suet holders being pivotably mounted so that access may be had to the interior thereof for inserting and removing the packages of suet.

Although it would be possible to use the spring either in a compression or tension state, a preferred embodiment mounts the spring interiorly of the housing about a rod, the bottom of which extends exteriorly of the housing. The rod is screwthreadably engaged with a nut which is non rotatable. In so doing, the tension on the spring can be increased by rotation of the rod within the nut which will cause further compression of the spring.

In one preferred embodiment, a plurality of detents are utilized for the pivotal movement of the suet holders and for retaining the suet holders in a closed position.

Surrounding the housing and associated components is a shroud. Typically, the shroud is formed of wire mesh and will have access openings which will permit the birds to gain access to the suet. However, when a weight greater than a predetermined weight is placed on the shroud (such as by a squirrel), the shroud will move downwardly with respect to the housing and suet holders thus denying access to the suet by the marauder. Preferably, the tension can be adjusted from exteriorly of the feeder and still more preferably the feeder will provide a visual indicator of the settings.

BRIEF DESCRIPTION OF THE DRAWINGS

Having thus generally described the invention, reference will be made to the accompanying drawings illustrating an embodiment thereof, in which:

FIG. 16 is an exploded view of the suet feeder.

DETAILED DESCRIPTION OF THE INVENTION

Figure 1:
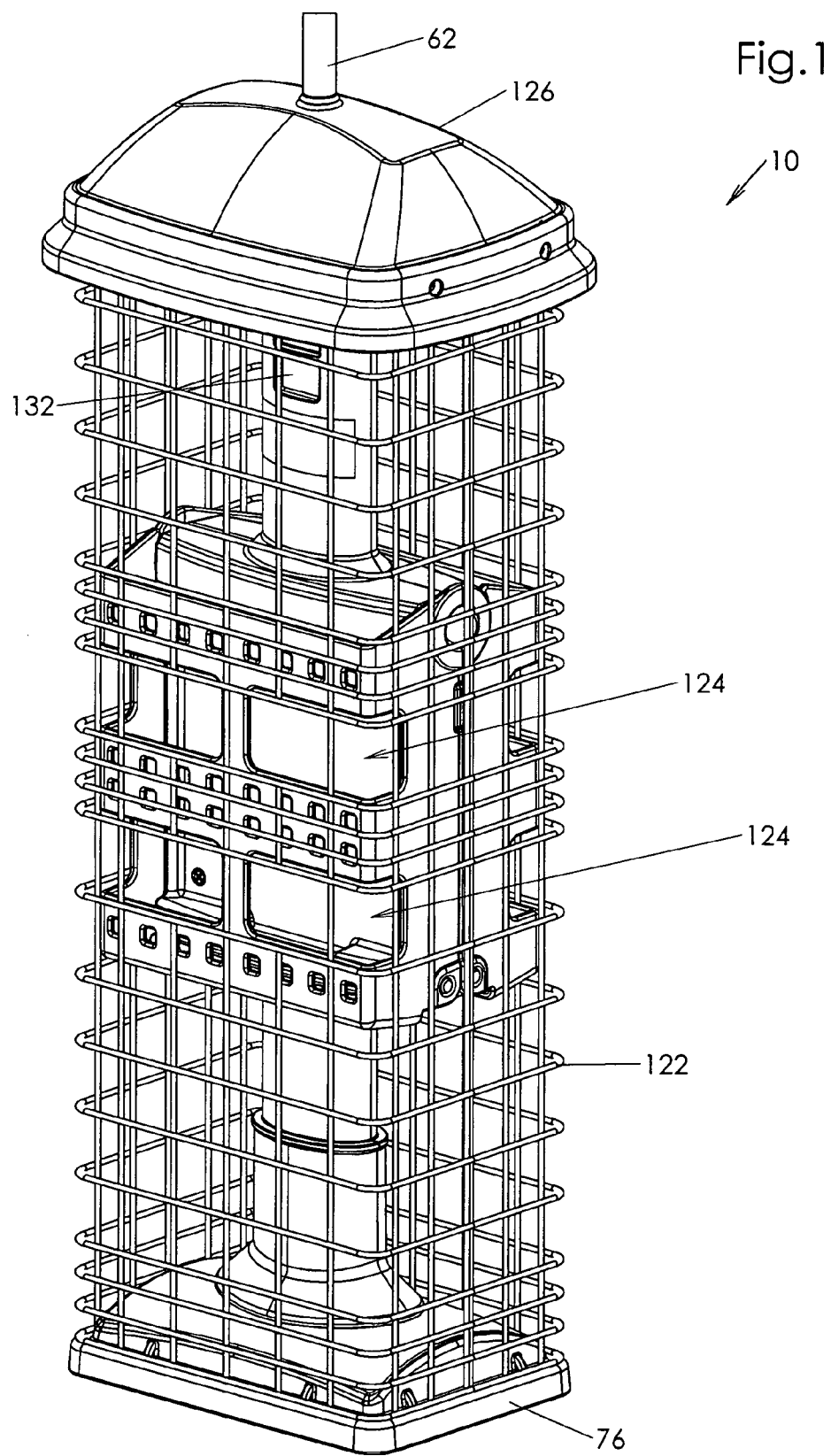
FIG. 1 is a perspective view of the suet feeder according to an embodiment of the present invention and wherein the suet may be accessed.
Figure 2:
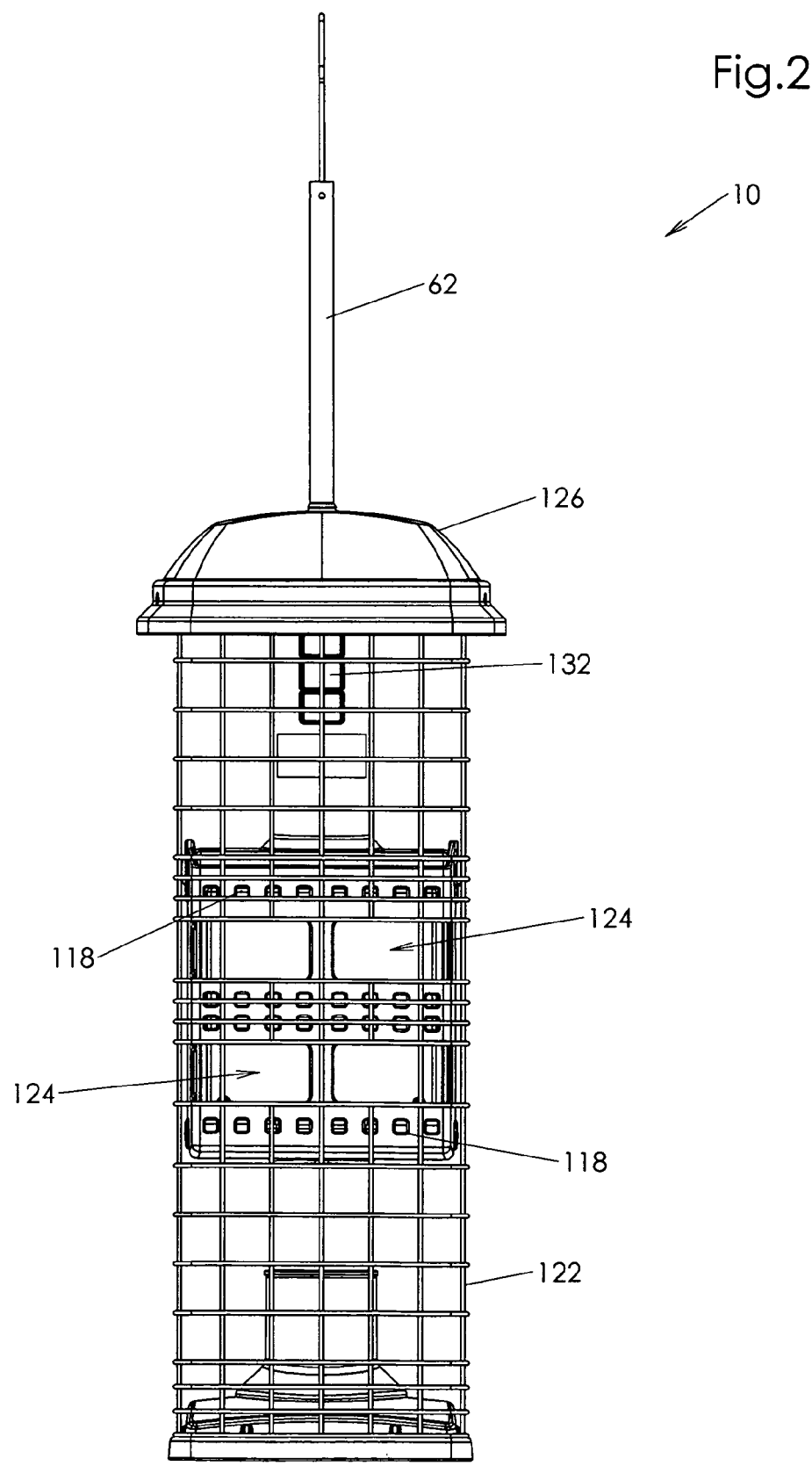
FIG. 2 is a front view thereof.
Figure 3:
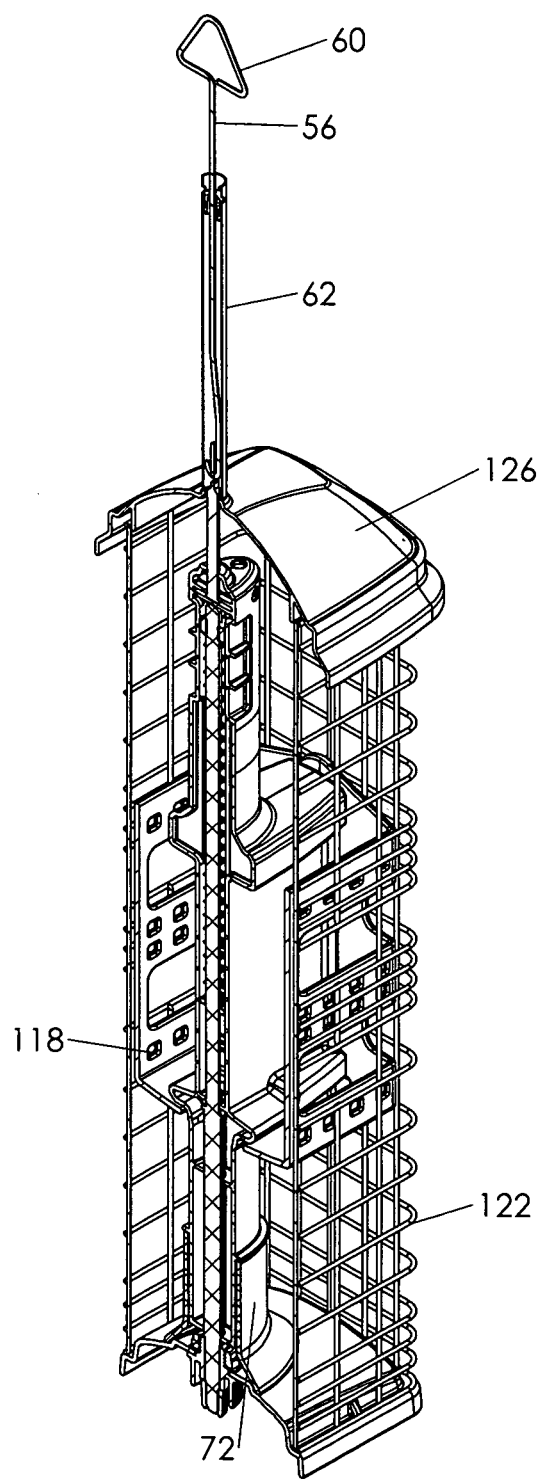
FIG. 3 is a longitudinal sectional view thereof.
Figure 4:
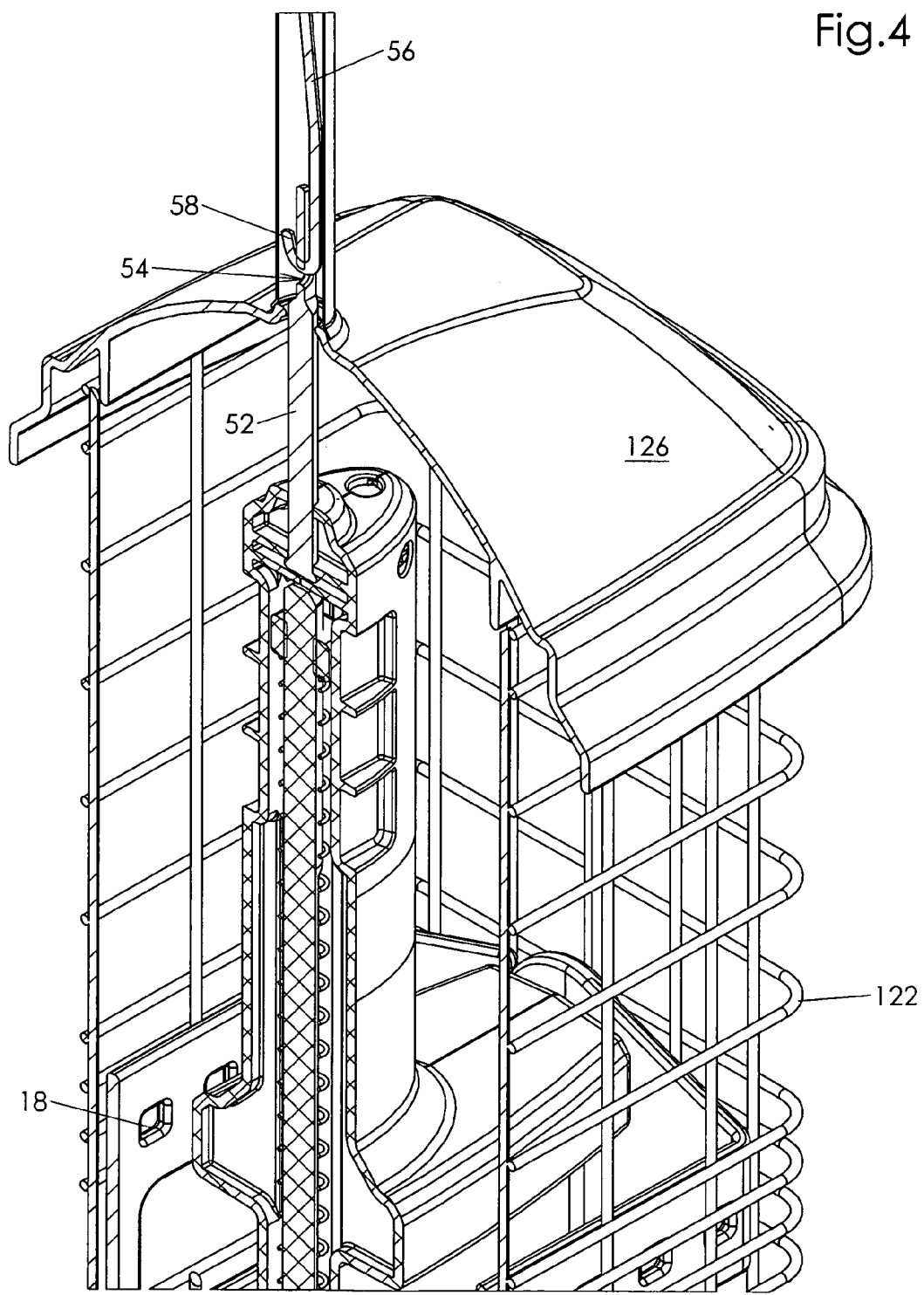
FIG. 4 is an enlarged view of the upper portion of FIG. 3.
Figure 5:
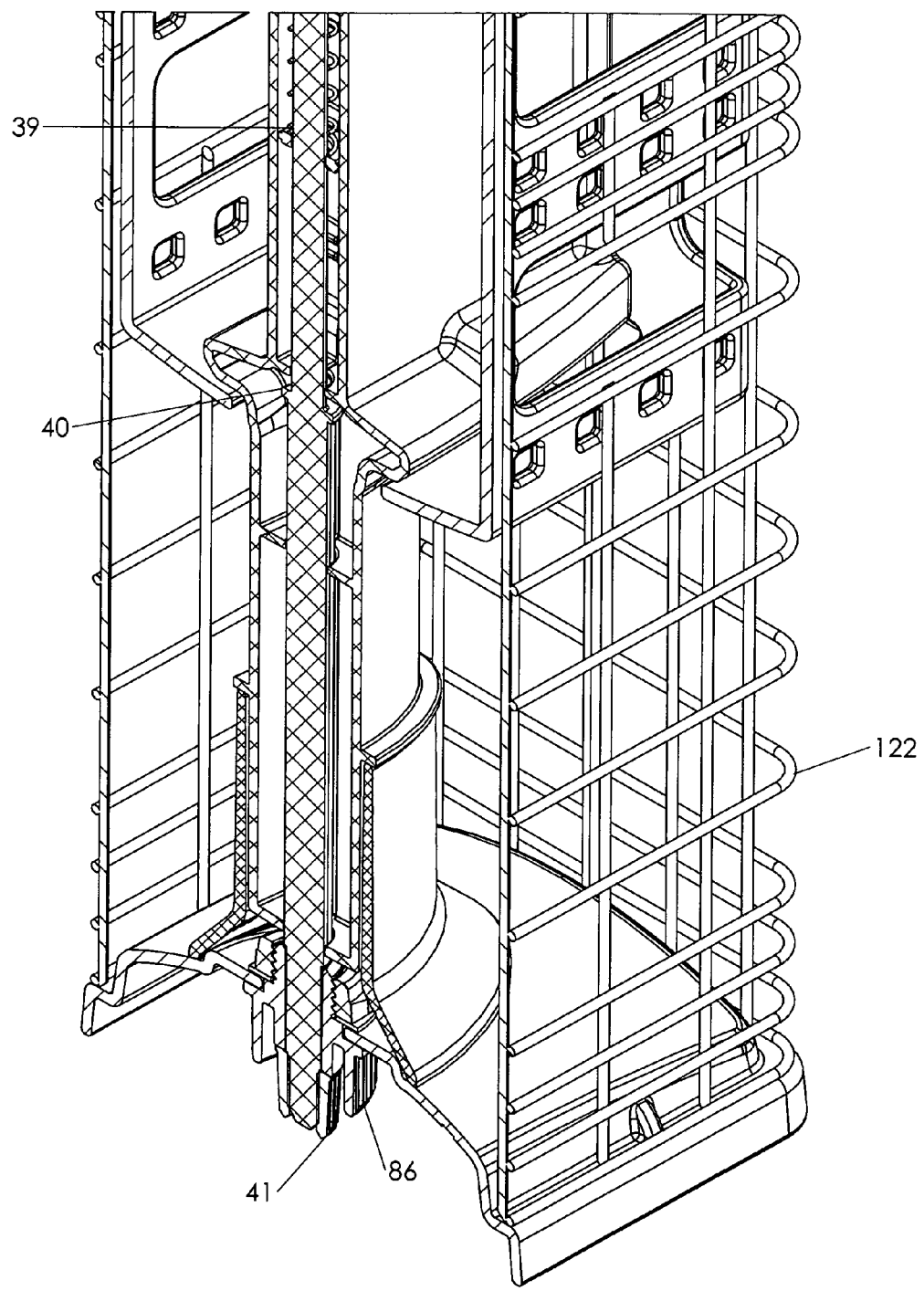
FIG. 5 is an enlarged view of the lower portion of FIG. 3.
Figure 6:
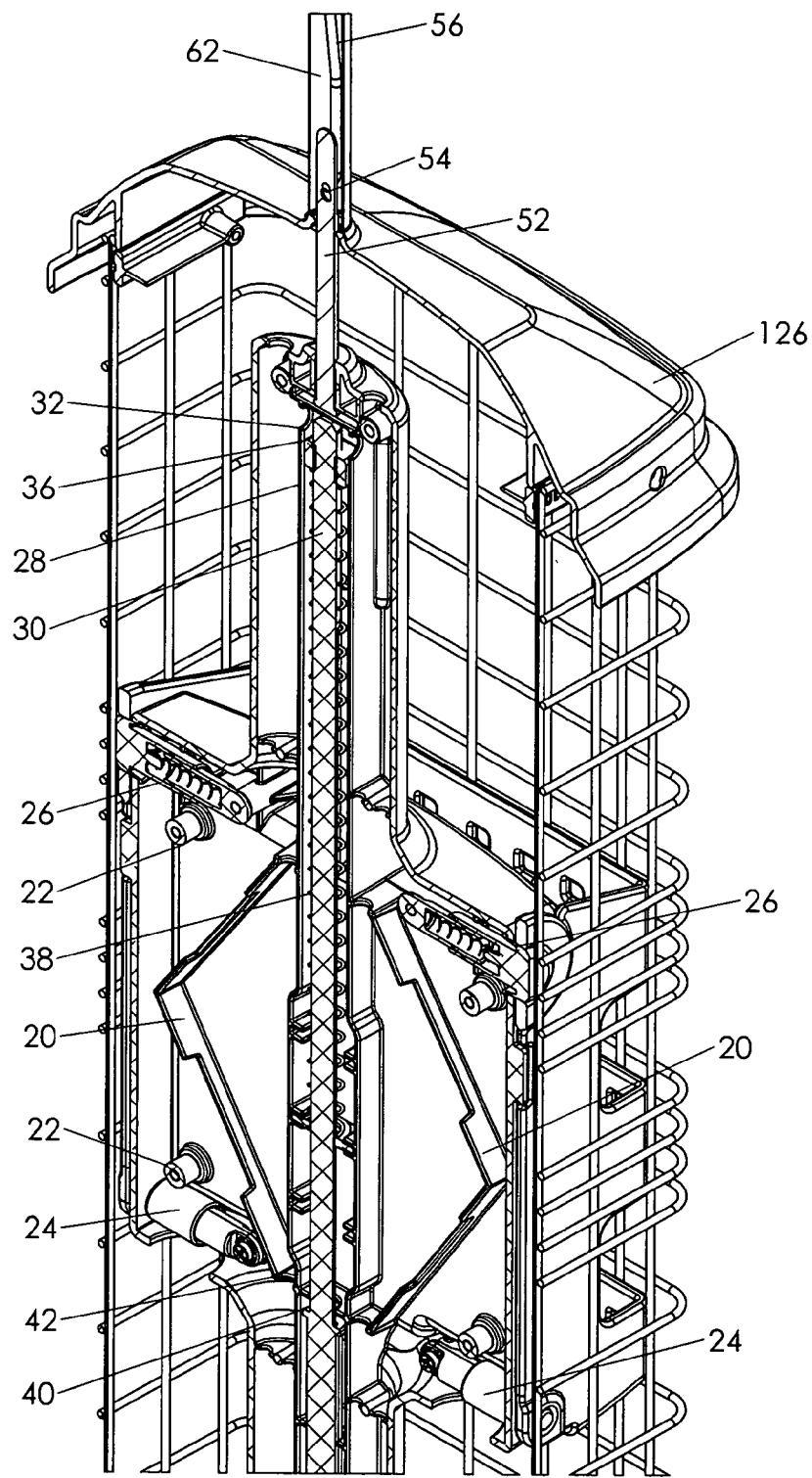
FIG. 6 is an enlarged cross sectional view of the upper portion of the suet feeder of FIG. 1 in a second longitudinal direction.
Figure 7:
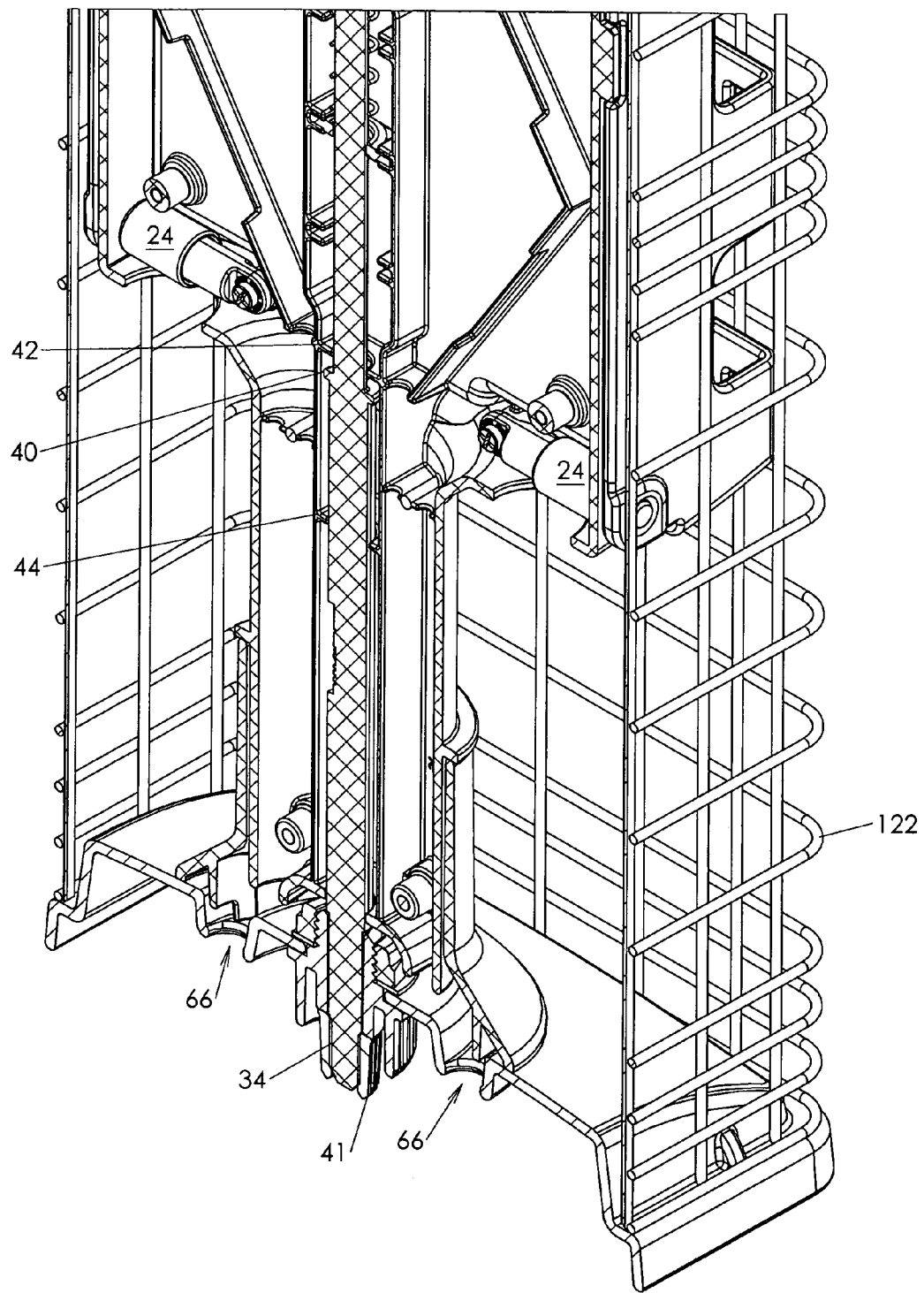
FIG. 7 is an enlarged sectional view of the lower portion of FIG. 6.
Figure 8:
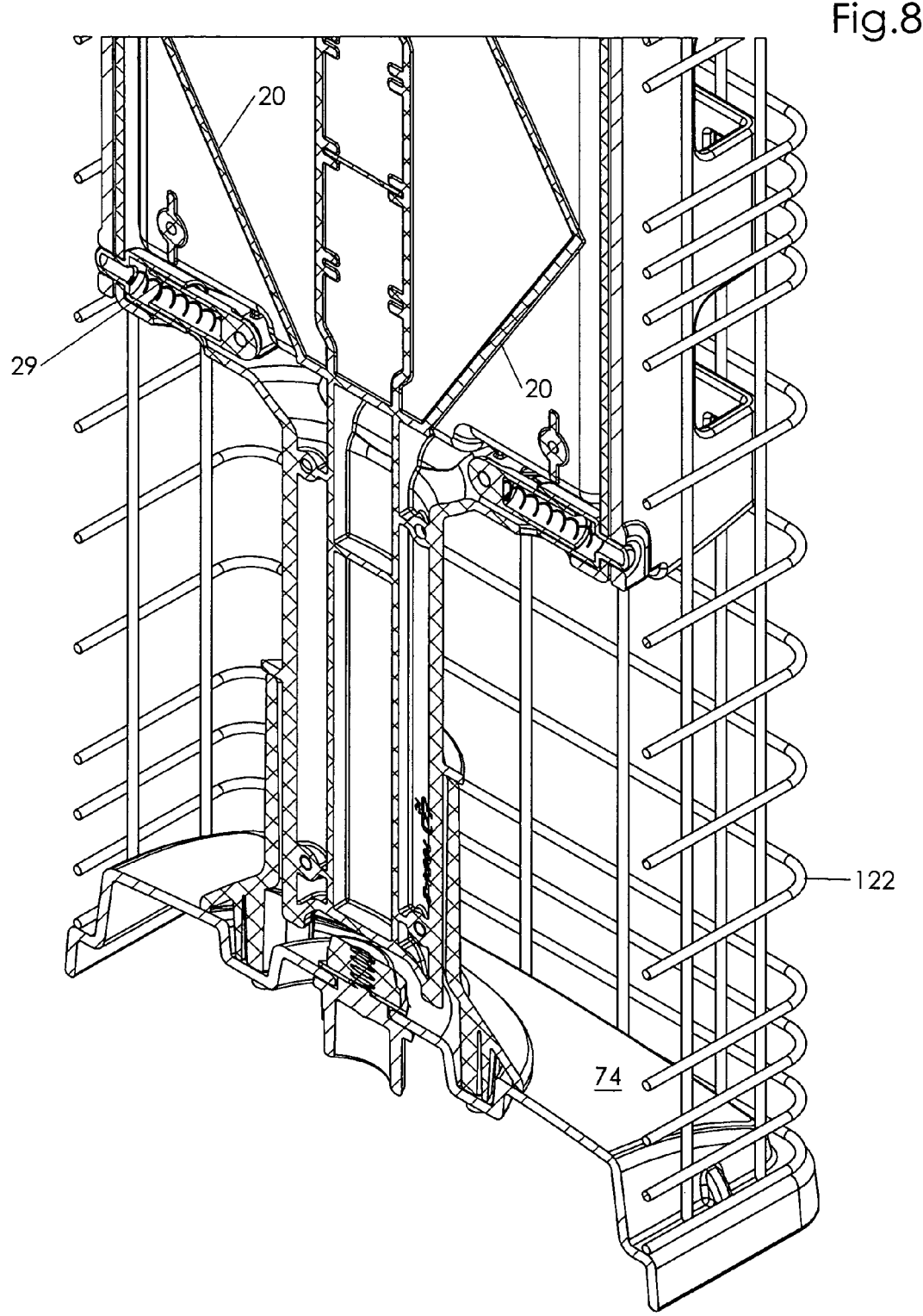
FIG. 8 is a view similar to FIG. 7 with some components removed.
Figure 9:
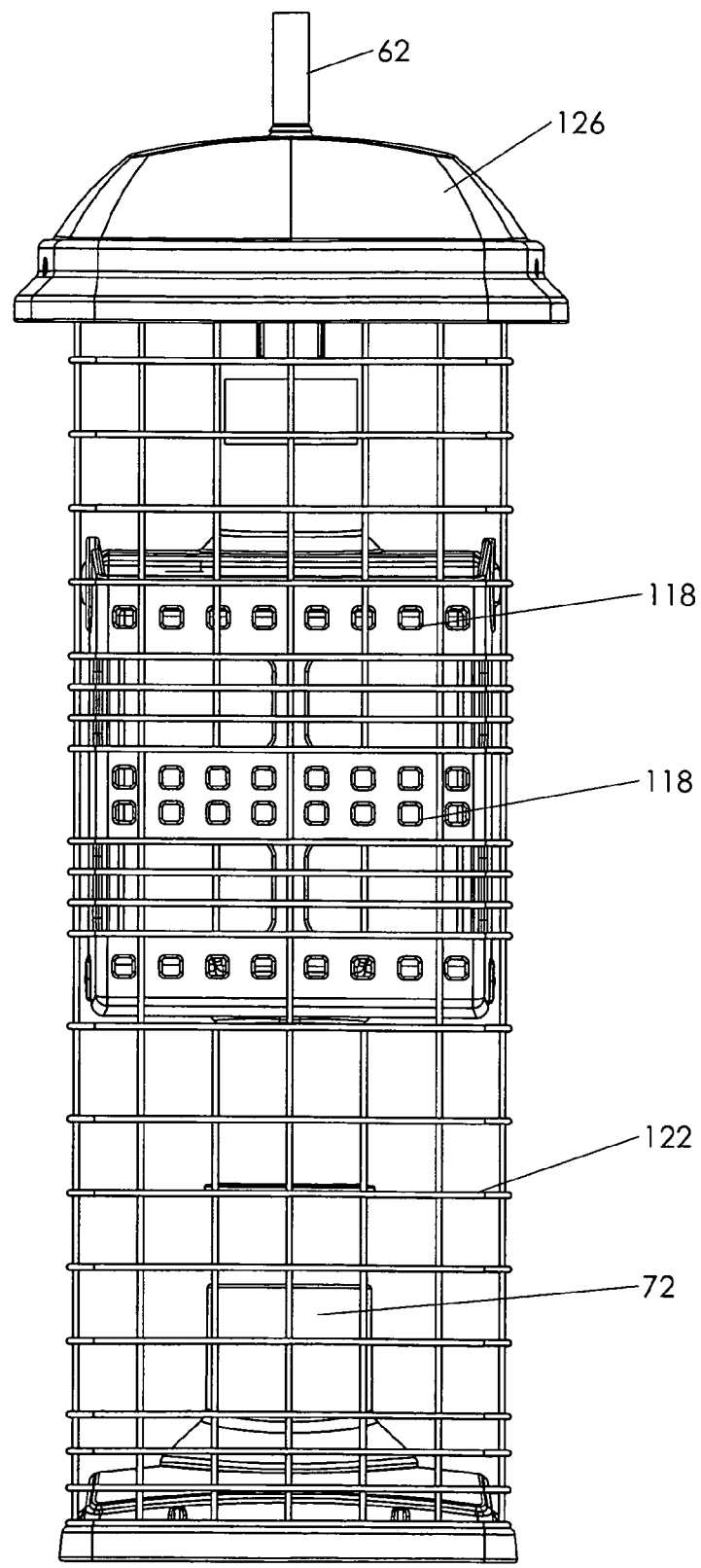
FIG. 9 is a front view of the suet feeder in a closed position.
Figure 10:
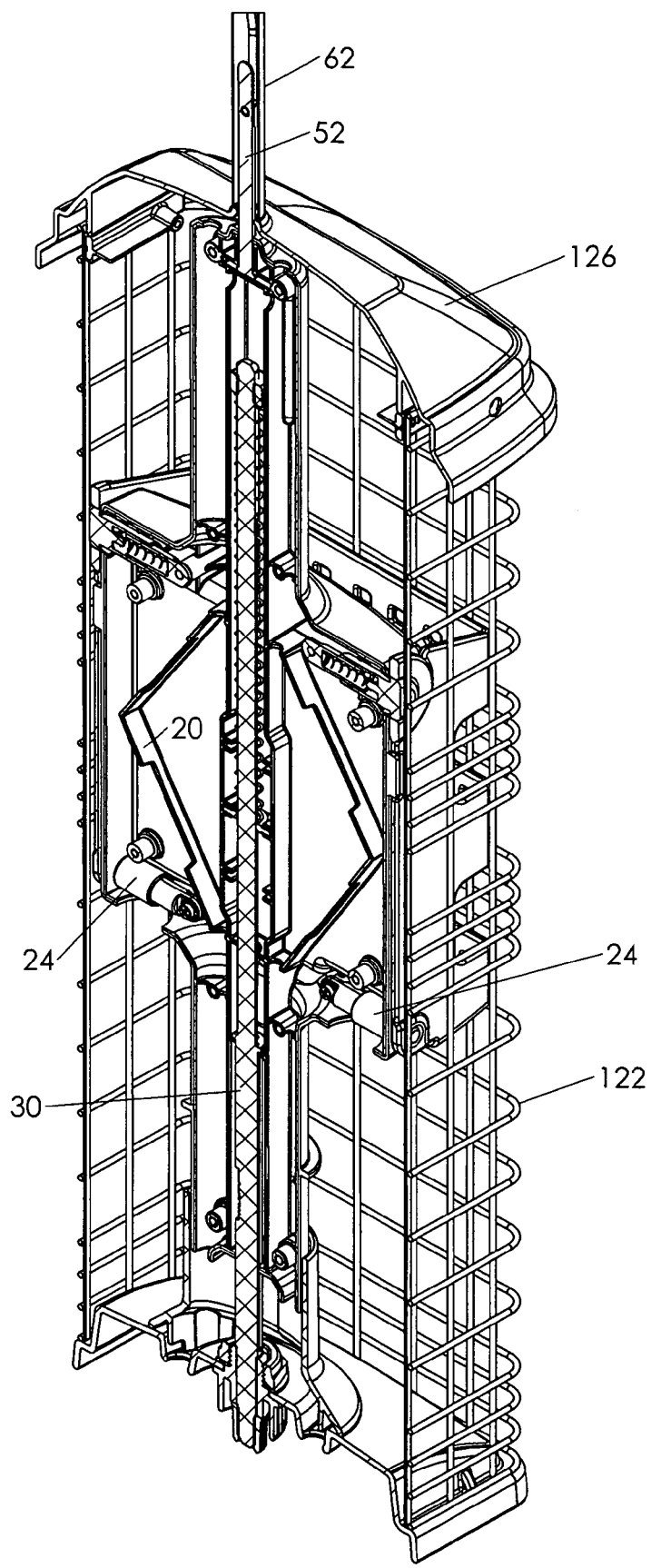
FIG. 10 is a longitudinal sectional view of the suet figure in the position of FIG. 9.
Figure 11:
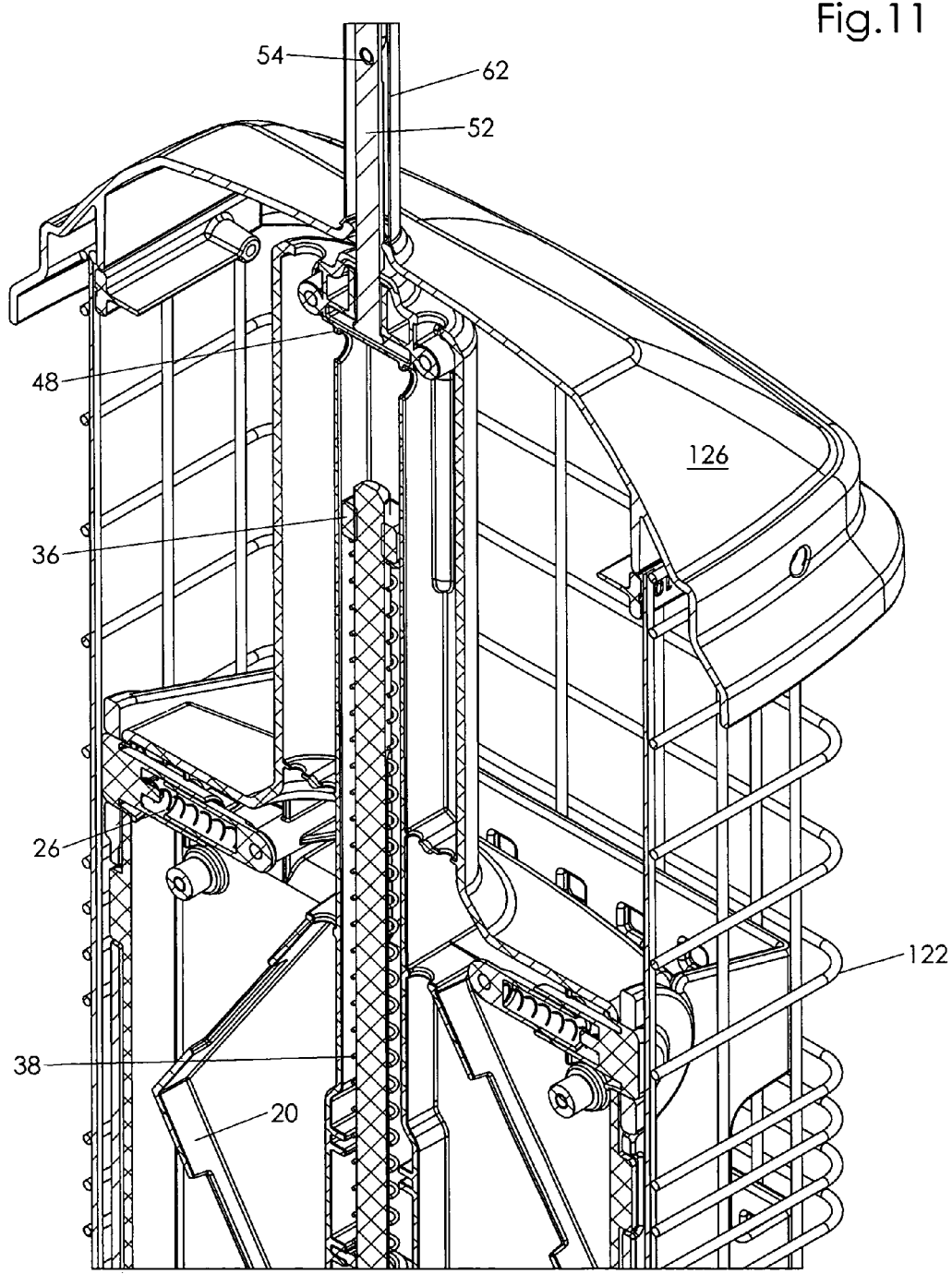
FIG. 11 is an enlarged sectional view of the upper portion of the suet feeder in the position of FIG. 10.
Figure 12:
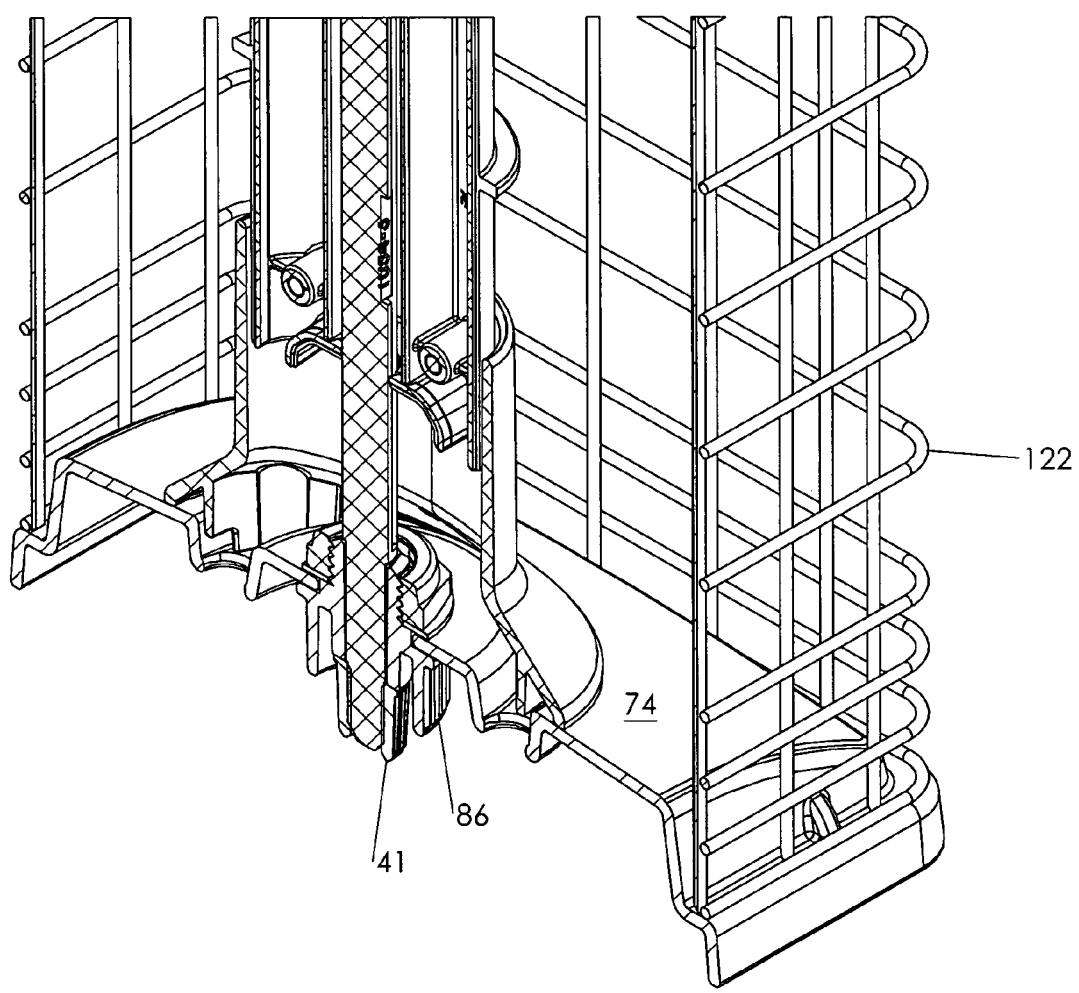
FIG. 12 is an enlarged sectional view of the lower portion thereof.
Figure 13:
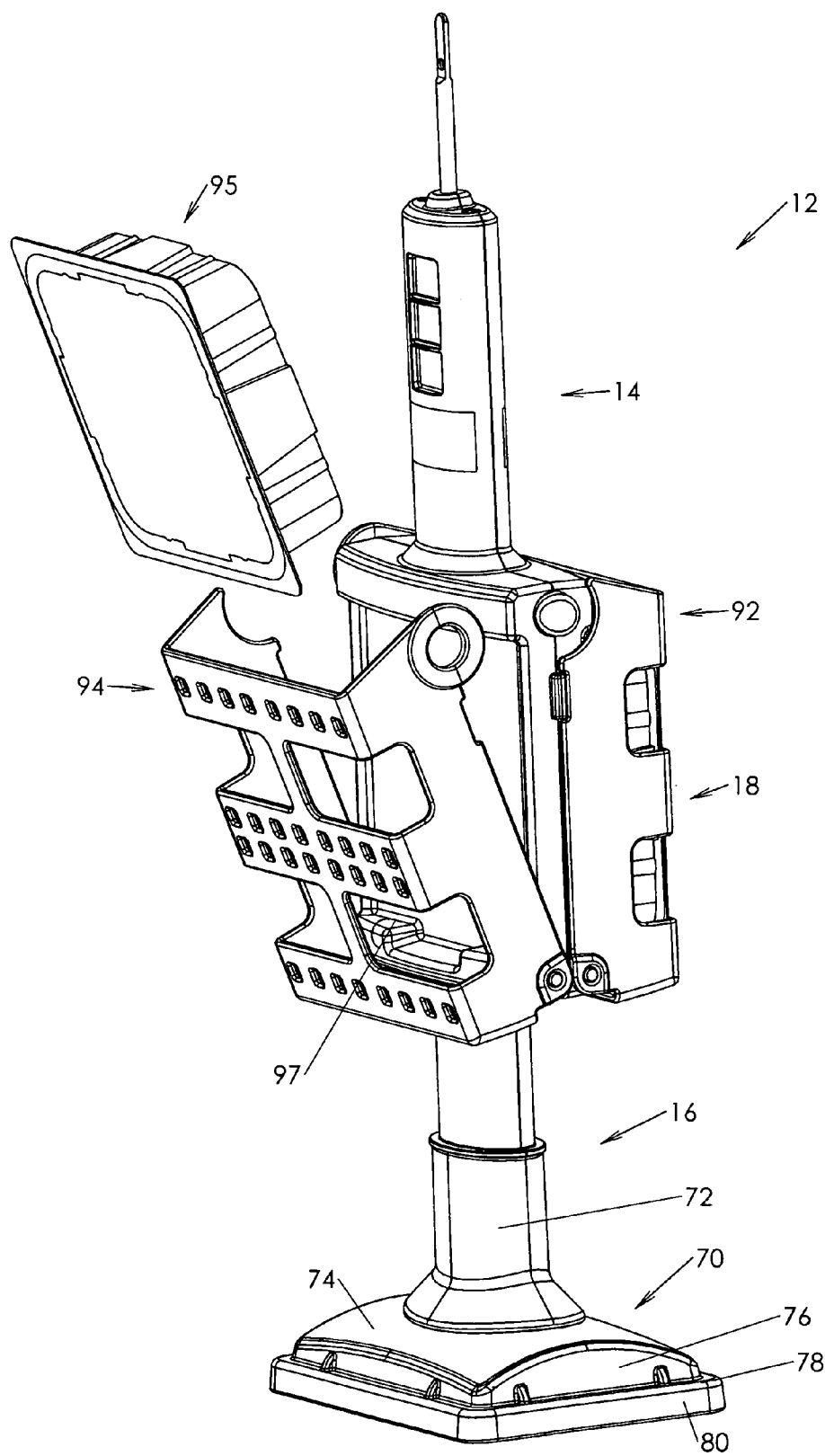
FIG. 13 is a perspective view of the central portion of the suet feeder with the shroud removed.
Figure 14:
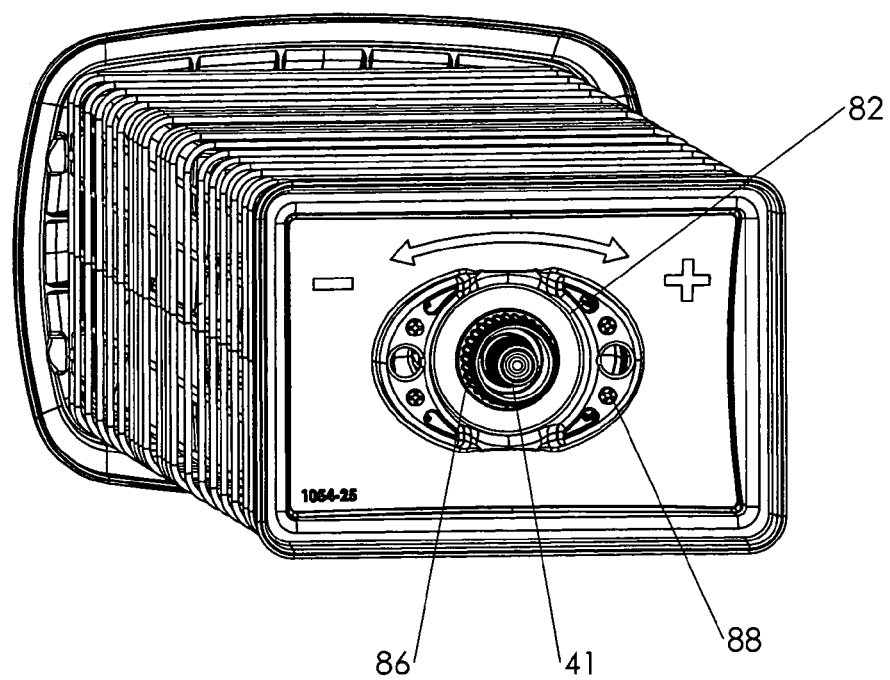
FIG. 14 is a perspective view illustrating the bottom of the suet feeder.
Figure 15:
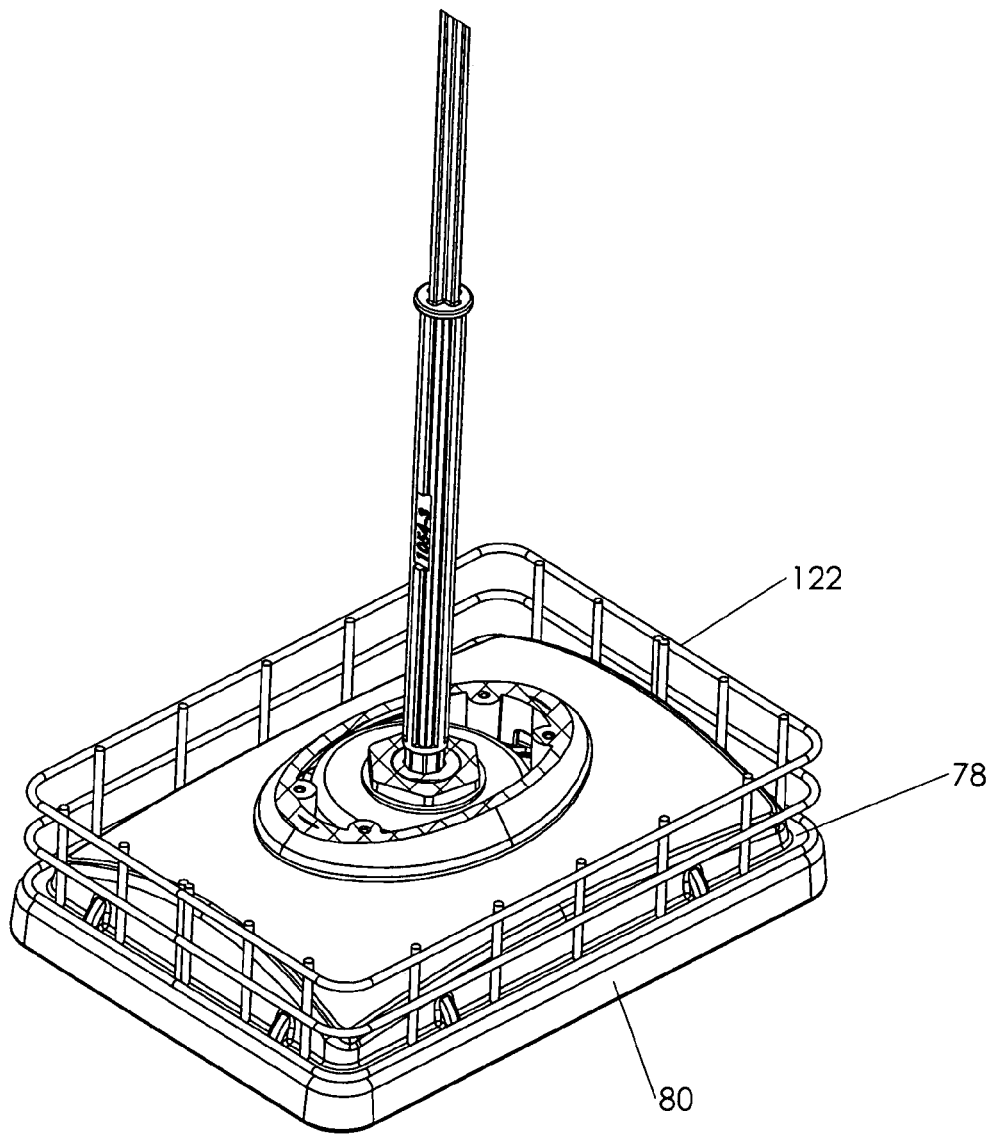
FIG. 15 is a perspective view of the base portion thereof.

A suet feeder according to one embodiment of the present invention is generally designated by reference numeral 10 and includes a central housing 12. Central housing 12 has an upper portion 14, a lower portion 16, and a center portion 18 as seen in FIG. 13. In this description, the terms lower and upper are used for purposes of the clarity of this description with it being understood that the terms refer to the orientation of the suet feeder when in its normal operational position. On center portion 18 as seen in FIG. 6, there are provided a plurality of reinforcing ribs 20 along with screw receptacles 22. In the preferred embodiment, the central housing may be molded into halves and mechanically held together by screw fasteners in screw receptacles 22. Naturally, other means of holding the two halves together may be utilized including other mechanical fasteners, adhesive, etc.

Mounted within center section 18 are a pair of lower retaining members 24, being situated at the lower position of center portion 18. Each retaining member 24 comprises a housing 25, a pin 27, a coil spring 29 and screw 31. Also mounted in center portion 18 are a pair of upper retaining members 26, one on each side and of a similar structure. As will be seen, lower retaining members 24 serve both as a pivot point for the suet holders as will discussed in greater detail herein and also as a retaining member. Upper retaining members 26 function to latch the suet holders in position.

Extending through upper portion 14, lower portion 16 and center portion 18 is an inner tube 28. Mounted within inner tube 28 is an elongated rod 30 which has threads 32 on the top end thereof and threads 34 on the lower end. Engaged with threads 32 is a nut 36 which is configured so as to be non-rotatable within inner tube 28. A coil spring 38 is mounted around rod 30 and at one end is biased against nut 36 and at the other end is biased against a stopper 39. A nut 41 is secured to threads 34 on the lower end.

An enlarged stopper 40 is provided at a lower end of rod 30 and is designed to limit travel of rod 30 between a molded upper stop 42 and a molded lower stop 44.

Suet feeder 10 includes a hanger attachment element 46 which has an enlarged end 48 designed to fit in a slot (not numbered) molded in upper portion 14. Shaft 52 of hanger attachment element 46 extends upwardly and includes an aperture 54 formed therein. A hanger 56 has a hook 58 at one end thereof for engaging with aperture 54 and at the other end has a hanging eye 60. A negative grip tube 62 is designed to fit about hanger 56 and hanger attachment element 46.

The central housing 12 includes upper ventilation apertures and lower drainage apertures 66 to permit the ingress and egress of any moisture and air as required.

Suet feeder 10 also includes a base 70 having an upper elliptical portion 72 which is designed to prevent rotation of central housing 12. Lower portion 16 fits within upper elliptical portion 72 as may be seen.

Base 70 also includes a top wall 74, an upper side wall 76 and a horizontal shroud receiving wall 78 which is designed to support the shroud as will be discussed in greater hereinbelow. Extending downwardly from shroud receiving wall 78 is a lower side wall 80.

The suet feeder 10 includes an adjustment mechanism generally designated by reference numeral 82. Adjustment mechanism 82 includes an inner rod holder 84 which is designed to securely retain the lower portion of rod 30 therein. This may be done by means of configuration or the like such that rotation of inner rod holder 84 will cause rotation of rod 30. Adjustment mechanism 82 also includes an outer hand grip 86 for turning inner rod holder 84. A plurality of screws 88 are provided for retaining upper elliptical portion 72 on top wall 74.

Suet feeder 10 includes a pair of suet holders 92 and 94 each designed to retain a suet package 95 and each of which are mirror images of each other and thus only one will be described herein. Suet holder or retainer 92 includes a base or bottom wall 96, a first side wall 98 having an outwardly extending flange 100 at an upper end thereof with an aperture 102 being formed in flange 100. Side wall 104 has a recess 106 formed therein at an upper portion thereof.

Suet holder 92 includes an upper front wall section 108, a lower front wall section 112 and a middle front wall section 110. Between upper wall section 108 and middle front wall 110 there are formed a pair of open sections 114 to permit access to the suet. Similarly, there is provided a pair of open sections 116 between lower front wall section 112 and middle front wall section 110. Suet package 95 is supported by a horizontal wall 95 of central housing 12.

It will be noted that there are apertures 118 provided in each of the upper front wall section 108, lower front wall section 112 and middle front wall section 110.

Suet feeder 10 also includes a shroud 122 and is of a known grid like structure preferably of a metallic material. Formed within the side walls are access openings 124.

A cover 126 is mounted on top of shroud 122. A pair of retaining members 128 are mounted on shroud 122 and a plurality of screws 130 are used to retain cover 126 securely mounted to retaining members 128.

Upper portion 14 of central housing 12 may have a transparent portion 132 in order to provide visual access to nut 36 to verify its position and therefore the tension of spring 38.

In operation, any weight in excess of that predetermined by setting of spring 38 will cause cover 126 and shroud 122 to move downwardly and thus deny access through access openings 124. However, since the same setting may deny access to some heavier birds such as woodpeckers, blue jays and the like, limited access may be had by the longer beak birds through apertures 118 formed in wall sections 108, 110 and 112.

As will be seen from the above, the base functions to tie the structure together. Thus, base 70 is designed to receive shroud 122 and support the same. At the same time, upper elliptical portion 72 receives and is designed to prevent rotation of central housing 12 such that the relationship between shroud 122 and central housing 12 is constant in a vertical plane. In turn, nut 41 secures the central portion to base 70.

It will be understood that the above described embodiments are for purposes of illustration only and that changes and modifications may be made thereto without departing from the spirit and scope of the invention.

I claim:

1. A suet feeder comprising:
   a housing having a spring mounted therein, a suet holder connected to said housing, said suet holder being sized to retain a prepackaged package of suet, said suet holder having at least one open area and at least one relatively closed area;
   a shroud extending about said suet holder and at least a portion of said housing;
   said spring biasing said shroud upwardly with respect to said housing and suet holder;
   said shroud having at least one suet access opening therein to permit access to said suet holder when said suet access opening is aligned with said open area of said suet holder, said shroud being moveable between an open position permitting access to said suet holder and a closed position wherein access to said suet holder is denied when said relatively closed area of said suet holder is aligned with said at least one suet access opening, said relatively closed area being sufficiently solid to prevent a squirrel from having access to suet within said suet holder; and a cover secured to said shroud.

2. The suet feeder of claim 1 further including a rod within said housing, said spring being mounted about said rod, said rod having an upper threaded portion, a nut engaged with said upper threaded portion.

3. The suet feeder of claim 2 further including a center tube, said rod being mounted within said center tube, said nut being held by said center tube in a non-rotatable position.

4. The suet feeder of claim 3 further including a pair of stop members within said center tube to limit movement of said rod, and a retaining member on the bottom of said rod.

5. The suet feeder of claim 4 further including a base, an adjustment member located at the bottom of said rod exteriorly of said base, said adjustment member being operative to rotate said rod with respect to said nut to thereby compress or release said spring.

6. The suet feeder of claim 5 wherein a portion of said center tube is transparent to provide visual access to said nut.

7. The suet feeder of claim 3 wherein said suet holder has a plurality of suet access openings, said suet access openings being separated by said at least one relatively closed area.

8. The suet feeder of claim 7 wherein said suet holder has a plurality of relatively small apertures formed in said at least one relatively closed area to permit access to suet within said suet holder by certain birds even when said shroud is in a closed position.

9. The suet feeder of claim 3 wherein said suet holder is pivotably mounted on said housing.

10. The suet feeder of claim 9 wherein said housing has first and second lower spring detents, said suet holder having first and second lower apertures to receive said detents to thereby permit pivotable movement.

11. The suet feeder of claim 10 wherein said housing has an upper spring detent, said suet holder having an upper aperture to receive said upper spring detent to thereby lock said suet holder in a closed position.

12. The suet feeder of claim 11 further including drainage and ventilation apertures in upper and lower portions of said housing to permit egress of moisture and air.

13. The suet feeder of claim 1 wherein there are provided a pair of suet holders, one on each side of said housing.

14. The suet feeder of claim 13 wherein each of said suet holders and said housing have a base to support said prepackaged package of suet.

15. The suet feeder of claim 1 wherein said suet holder is located proximate the center of the height of said housing.

16. The suet feeder of claim 1 wherein said suet feeder further includes a base, said base having an upper portion of a non circular configuration, said housing being mounted within said upper portion.

17. The suet feeder of claim 1 wherein said shroud extends the height of said housing, said shroud being formed of vertical and horizontal wires spaced apart to permit perching thereon by birds.

18. A suet feeder and a prepackaged package of suet comprising:

a housing having a spring mounted therein, a suet holder connected to said housing, said prepackaged package of suet being mounted in said suet holder;

a shroud extending about said suet holder and at least a portion of said housing;

said spring biasing said shroud upwardly with respect to said housing and suet holder;

said shroud having at least one suet access opening to permit access to said suet holder, said shroud being moveable between an open position permitting access to said suet holder and a closed position where access to said suet holder is denied; and a cover secured to said shroud.

* * * * *